United States Patent [19]

Veit

[11] Patent Number: 5,529,370
[45] Date of Patent: Jun. 25, 1996

[54] TRIM PANEL MOUNTING ASSEMBLY

[75] Inventor: David M. Veit, Canton, Mich.

[73] Assignee: Ford Motor Company, Dearborn, Mich.

[21] Appl. No.: 511,577

[22] Filed: Aug. 4, 1995

[51] Int. Cl.⁶ ........................................................ B60J 5/04
[52] U.S. Cl. ........................... 296/146.7; 296/152; 49/502
[58] Field of Search .................................. 296/146.7, 152; 49/502

[56] References Cited

U.S. PATENT DOCUMENTS

| 1,890,615 | 12/1932 | Kneeshaw . | |
|---|---|---|---|
| 2,191,780 | 2/1940 | Tinnerman . | |
| 2,350,255 | 5/1944 | Shippee et al. . | |
| 2,618,824 | 11/1952 | Poupitch . | |
| 3,448,494 | 6/1969 | Boyenval et al. . | |
| 4,017,945 | 4/1977 | Stanik et al. . | |
| 4,529,244 | 7/1985 | Zaydel . | |
| 4,923,542 | 5/1990 | Janicki et al. . | |
| 4,949,508 | 8/1990 | Elton | 296/146.7 X |
| 5,106,223 | 4/1992 | Kraus . | |
| 5,111,619 | 5/1992 | Billin et al. | 296/39.1 X |
| 5,169,204 | 12/1992 | Kelman . | |
| 5,345,721 | 9/1994 | Stein et al. | 49/502 |
| 5,367,751 | 11/1994 | DeWitt . | |

FOREIGN PATENT DOCUMENTS 6-55937  3/1994  Japan .................................. 296/146.7

*Primary Examiner*—Joseph D. Pape
*Attorney, Agent, or Firm*—David B. Kelley; Roger L. May

[57] ABSTRACT

A trim mounting assembly for automotive vehicles including a trim panel bracket mounted on one side of the trim panel opposite the interior of the vehicle and a support bracket mounted to an inner door panel opposite the trim panel bracket. The trim panel bracket includes a clip and a leg with the leg disposed spaced from the clip on the trim panel bracket. The support bracket includes a clip and leg with the leg disposed spaced from the clip on the support bracket. The clip and the leg on the support bracket are arranged asymmetrically with respect to the clip and the leg on the trim panel bracket such that the leg on a trim panel bracket is received in the clip of the support and the leg of the support bracket is received in the clip on the trim panel bracket to provide a direct load path for the trim panel to the inner door panel of the vehicle.

15 Claims, 3 Drawing Sheets

TRIM PANEL MOUNTING ASSEMBLY

BACKGROUND OF THE INVENTION

1. Field of the Invention

The present invention relates generally to a trim panel mounting assembly and, more specifically, to a door trim panel mounting assembly for providing a direct load path in the area of the door handle mounted to the trim panel.

2. Description of the Related Art

Trim panels are employed as interior components on automotive vehicles. One of the purposes of such interior trim panels is to present an anesthetically pleasing appearance. Interior trim panels are typically mounted to structural support members on the frame or other structural components of the automotive vehicle. For example, trim panels are mounted to an inner door sheet metal panel of an automotive vehicle.

While they are not usually employed as structural components, there are times when door trim panels must support a load. One instance when this can occur involves loads placed on the door during opening or closing thereof via activation of a door pull handle. Door pull handles are typically mounted to the trim panels and are employed not only to pull the door shut once the occupant has entered the vehicle but can also sometimes be used as a support for the occupant as he/she enters the vehicle. This situation can occur during the egress/ingress of a truck or van where the occupant compartment is disposed relatively above the waist of the occupant. Depending on the reliance of the occupant on the support of the door pull handle, as well as the occupant's weight and manner of pulling the door shut, it is possible that substantial loads can be generated at the pull handle on the trim panel. In fact, it is possible for the trim panel to undergo substantial deflection at the location when the loads become excessive. Thus, there is a need in the art for securely mounting the door pull handle to the interior trim panel of a door so as to sustain such loads.

At the same time, there are strict aesthetic requirements for the interior of most automotive vehicles which prohibit the use of exposed fasteners which might otherwise be used to strengthened the door pull handle/trim panel interface so as to support increased loads. As such, the problem inherent with increased loads in door pull handles and objectionable deflection cannot merely be solved by providing more bolts or other fasteners in the area of the trim panel.

Thus, there is need in the art for a fastening device which can provide a direct load path from the pull handle to the inner door sheet metal via the door trim panel so as to sustain substantial, however infrequent, loads at the door pull handle on the interior door trim panel without any additional exposed fasteners or plug buttons.

SUMMARY OF THE INVENTION

Accordingly, the present invention is a trim panel mounting assembly for an automotive vehicle including a trim panel bracket mounted to one side of the trim panel opposite the interior of the vehicle and a support bracket mounted to vehicle structure opposite the trim panel bracket. The trim panel bracket includes a clip and leg with the leg disposed spaced from the clip on the opposite side of the trim panel bracket. Similarly, the support bracket includes a clip and a leg with its leg disposed spaced from the clip on the opposite side of the support bracket. The clip and leg on the support bracket are arranged asymmetrically with respect to the clip and leg on the trim panel bracket such that the leg of trim panel bracket is received in the clip of the support bracket and the leg of the support bracket is received in the clip of the trim panel bracket to provide a load path from the trim panel through the vehicle structure.

One advantage of the present advantage is that a trim panel mounting assembly is provided having a direct load path in the area of the door pull handle mounted to the trim panel. Mother advantage of the present invention is that a trim panel mounting assembly is provided having asymmetrically disposed trim panel and support brackets which cooperate to mount the trim panel to the inner door sheet metal without exposing fasteners or plug buttons on the interior of the vehicle. Still another advantage of the present invention is that a trim panel mounting assembly for an automotive vehicle is provided which is inexpensive, easy to assemble and which provides a direct load path from the door pull handle mounted to the trim panel through the vehicle door sheet metal.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
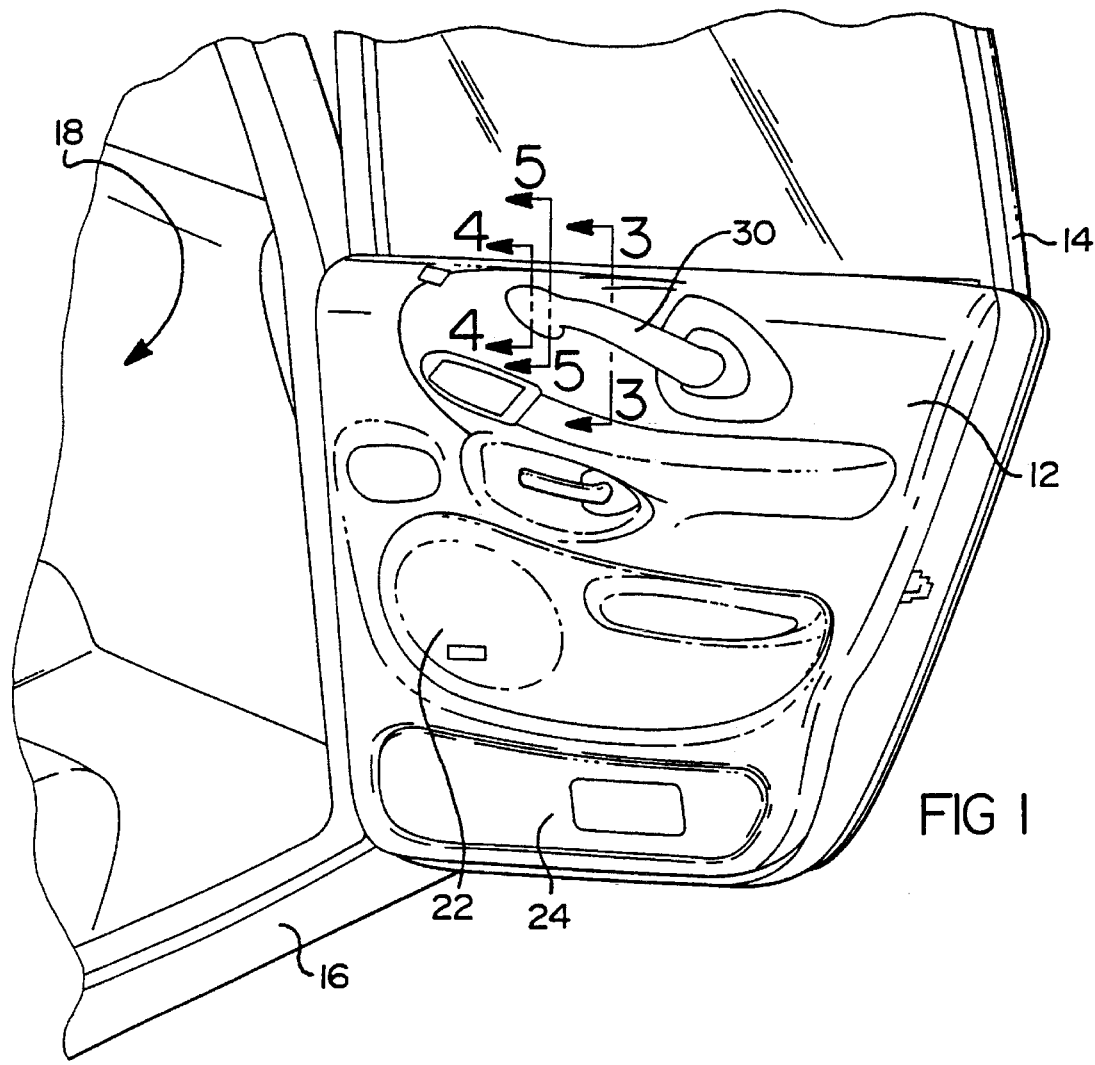
FIG. 1 is a perspective view illustrating a portion of an automotive vehicle showing a trim panel mounted to a door.
Figure 2:
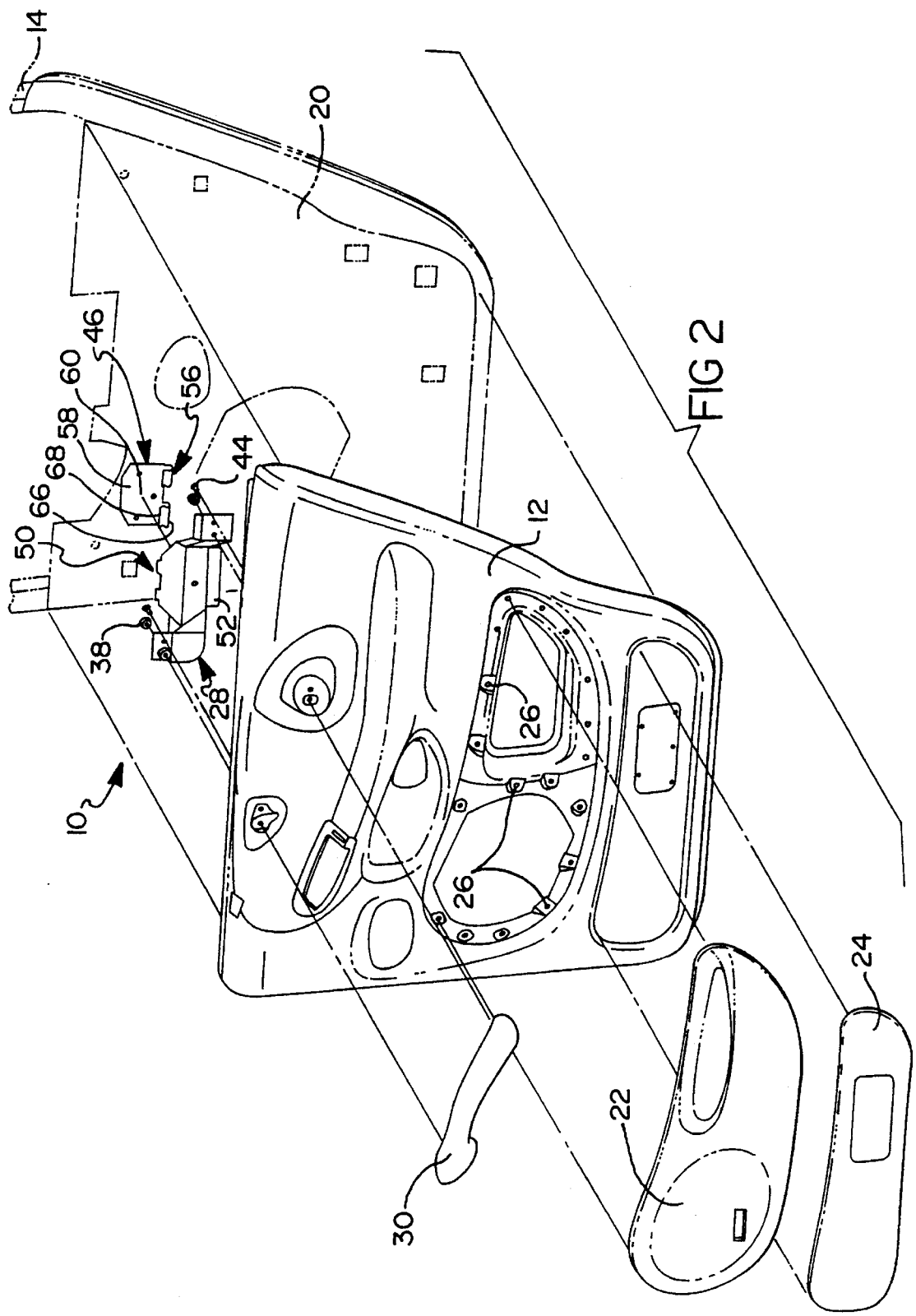
FIG. 2 is an exploded view of a trim panel mounting assembly according to the present invention.

Referring now to the drawings, one embodiment of a trim panel mounting assembly for an automotive vehicle is generally shown at 10 in the exploded view of FIG. 2. The trim panel mounting assembly 10 is adapted to mount a trim panel 12 to a door 14 of an automotive vehicle 16 as best shown in FIG. 1. While the trim panel mounting assembly 10 is shown in connection with a rear door 14, it should be appreciated that the present invention can be employed to mount any trim panel at a number of places on an automotive vehicle, including the front or rear doors or any other place, to provide a load path to a structural load bearing member of the vehicle. To that end, the specific trim panel shown in FIG. 1 is for purposes of illustration and not by way of limitation.

Automotive vehicles include occupant compartments which define the interior 18 of the automotive vehicle 16. Trim components, such as the trim panel 12, help to define the interior 18 of the occupant compartment and are often referred to as class A surfaces. Class A surfaces must meet strict aesthetic requirements, including requirements which limit and even eliminate fasteners and plug buttons exposed to the interior 18 of the automotive vehicle 16. Thus, in the environment depicted in the drawings, the trim panel 12 is mounted to an inner door panel 20 as shown in FIG. 2. The inner door panel 20 is typically manufactured of sheet metal and forms a part of the load bearing structure of the door 14.

The trim panel 12 may also include non-load bearing sub-components such as a center arm rest and audio speaker panel 22 and a lower kick panel 24. These non-load bearing trim components can be mounted to the trim panel 12 using clips as shown at 26 in FIG. 2 or any other fasteners suitable for the application.

Figure 4:
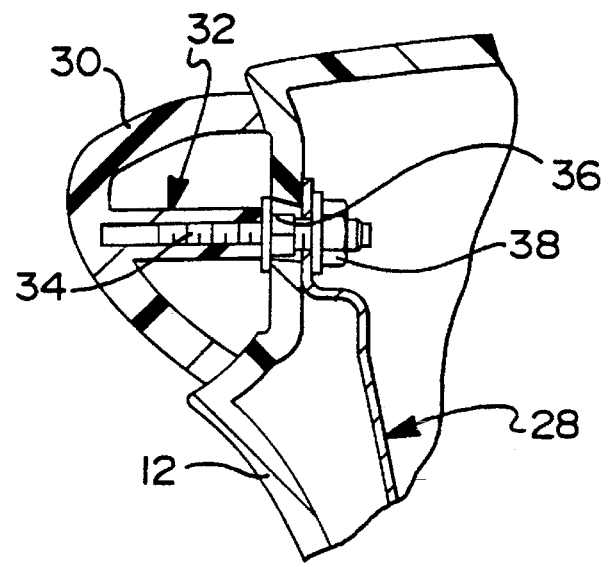
FIG. 4 is a sectional view taken along line 4—4 of FIG. 1.

The trim panel 12 also includes an integral trim panel bracket, generally indicated at 28, mounted on one side of the trim panel 12 opposite the interior 18. A door pull handle 30 is mounted to the trim panel 12 through the trim panel bracket 28 on the opposite side of the door panel 12 from the bracket 28 and facing the interior 18 of the automotive vehicle 16. The door pull handle 30 is adapted to be grasped by an occupant in the automotive vehicle 16 to facilitate the opening and closing of the door 14. To this end, and referring to FIG. 4, the door pull handle 30 includes a mounting structure, generally indicated at 32, molded at both ends of the door pull handle 30. A threaded stud 34 protrudes from the mounting structure 32 and extends through an aperture 36 provided in the trim panel 12 for that purpose. The threaded stud 34 is also received through an aperture in the trim panel bracket 28 and retained therein by a nut 38.

Figure 5:
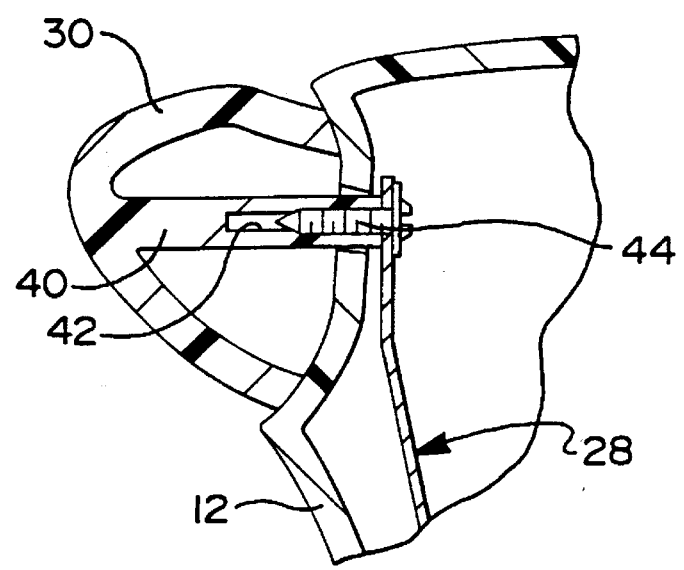
FIG. 5 is a sectional view taken along line 5—5 of FIG. 1.

The door pull handle 30 further includes a boss 40, as shown in FIG. 5, which is also molded at both ends of the door pull handle 30. The boss 40 includes a blind hole or aperture 42 which is adapted to receive a threaded machine screw 44 extending through the trim panel bracket 28 as well as the trim panel 12 itself. The door pull handle 30 is thus firmly mounted to the trim panel bracket 28 via the trim panel 12 without any fastener exposed to the interior 18 of the automotive vehicle 16.

Figure 3:
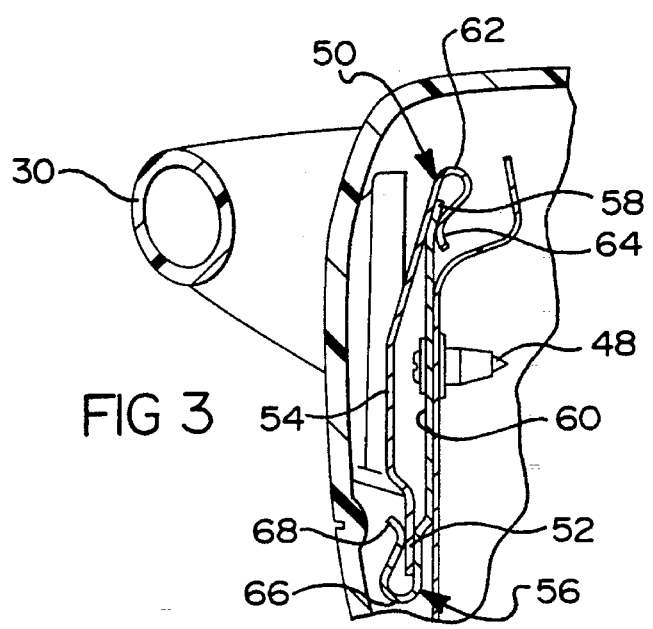
FIG. 3 is a sectional view taken along line 3—3 of FIG. 1.

As mentioned earlier, the structural inner door panel 20 supports the trim panel 12 and includes an integral support bracket, generally indicated at 46, mounted to the inner door panel 20 via fasteners 48. The support bracket 46 is located opposite the trim panel bracket 28 as can best be seen in FIGS. 2 and 3.

The trim panel bracket 28 includes at least one, but preferably a pair of clips, generally indicated at 50, and a leg 52. The leg 542 is disposed spaced from the clips 50 on the trim panel bracket 28. A body portion 54 extends between the clips 50 and the leg 52 on the trim panel bracket 28.

Similarly, the support bracket 46 includes at least one, but preferably a pair of clips generally indicated at 56, and a leg 58. The leg 58 is spaced from the clips 56 on the support bracket 46. A body portion 60 extends between the clips 56 and the leg 58 on the support bracket 46. Further, the body portion 60 on the support bracket 46 is disposed opposite and spaced from the body portion 54 on the trim panel bracket 28.

The clips 56 and leg 58 on the support bracket 46 are arranged asymmetrically with respect to the clips 50 and leg 52 on the trim panel bracket 28. Further, the leg 52 of the trim panel bracket 28 is received in the clips 56 of the support bracket 46. Similarly, the leg 58 of the support bracket 46 is received in the clips 50 on the trim panel bracket 28.

More specifically, each of the clips 50 of the trim panel bracket 28 include an integral C-shaped portion 62 located at one end of the trim panel 28 and a finger 64 biased into adjacent disposition with the body portion 54 on the trim panel bracket 28. The leg 58 of the support bracket 46 is received in the C-shaped portions 62 and engaged by the fingers 64 of the clips 50 of trim panel bracket 28. Similarly, each of the clips 56 on the support bracket 46 include an integral C-shaped portion 66 located at one end a support bracket 46 and a finger 68 which is biased into adjacent disposition with the body portion 60 of the support bracket 46. The leg 52 of the trim panel bracket 28 is received in the C-shaped portions 66 and engaged by the fingers 68 of the clips 56 of the support bracket 46.

Thus, the trim panel mounting assembly 10 of the present invention, through the cooperation of the interlocking trim panel and support brackets 28, 46, provides a direct load path from the pull handle 30 to the inner door sheet panel 20 via the door trim panel 12. In this way, the present invention allows the trim panel to sustain substantial loads at the door pull handle 30 on the interior door trim panel 12 without any addition exposed fasteners or plug buttons.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trim panel mounting assembly for an automotive vehicle comprising:

a trim panel bracket mounted to one side of a trim panel opposite an interior of the automotive vehicle and a support bracket mounted to an inner door panel opposite said trim panel bracket;

said trim panel bracket including a clip and a leg with said leg disposed spaced from said clip on said trim panel bracket, said support bracket including a clip and a leg with said leg disposed spaced from said clip on said support bracket;

said clip and said leg on said support bracket arranged asymmetrically with respect to said clip and said leg on said trim panel bracket such that said leg of said trim panel bracket is received in said clip of said support bracket and said leg of said support bracket is received in said clip on said trim panel bracket to provide a direct load path for the trim panel to the inner door panel of the vehicle.

2. A trim panel mounting assembly as set forth in claim 1 wherein said trim panel bracket includes a body portion extending between said clip and said leg on said trim panel bracket.

3. A trim panel mounting assembly as set forth in claim 2 wherein said support bracket includes a body portion extending between said clip and said leg on said support bracket and disposed opposite and spaced from said body portion on said trim panel bracket.

4. A trim panel mounting assembly as set forth in claim 3 wherein said clip of said trim panel bracket includes an integral C-shaped portion at one end of said trim panel bracket and a finger biased into adjacent disposition with said body portion of said trim panel bracket, said leg of said support bracket received in said C-shaped portion and engaged by said finger of said clip of said trim panel bracket.

5. A trim panel mounting assembly as set forth in claim 4 wherein said clip of said support bracket includes an integral C-shaped portion at one end of said support bracket and a finger biased into adjacent disposition with said body portion of said support bracket, said leg of said trim panel bracket received in said C-shaped portion and engaged by said finger of said clip of said support bracket.

6. A trim panel mounting assembly for an automotive vehicle comprising:

a trim panel having a trim panel bracket mounted on one side of said trim panel and an inner door panel having a support bracket mounted to said inner door panel opposite said trim panel bracket;

said trim panel bracket including a clip and a leg with said leg disposed spaced from said clip on said trim panel bracket, said support bracket including a clip and a leg with said leg disposed spaced from said clip on said support bracket;

said clip and leg on said support bracket arranged asymmetrically with respect to said clip and leg on said trim panel bracket such that said leg of said trim panel bracket is received in said clip of said support bracket and said leg of said support bracket is received in said clip on said trim panel bracket to provide a direct load path for the trim panel to the inner door panel of the vehicle.

7. A trim panel mounting assembly as set forth in claim 6 wherein said trim panel bracket includes a body portion extending between said clip and said leg on said trim panel bracket.

8. A trim panel mounting assembly as set forth in claim 7 wherein said support bracket includes a body portion extending between said clip and said leg on said support bracket and disposed opposite and spaced from said body portion on said trim panel bracket.

9. A trim panel mounting assembly as set forth in claim 8 wherein said clip of said trim panel bracket includes an integral C-shaped portion at one end of said trim panel bracket and a finger biased into adjacent disposition with said body portion of said trim panel bracket, said leg of said support bracket received in said C-shaped portion and engaged by said finger of said clip of said trim panel bracket.

10. A trim panel mounting assembly as set forth in claim 9 wherein said clip of said support bracket includes an integral C-shaped portion at one end of said support bracket and a finger biased into adjacent disposition with said body portion of said support bracket, said leg of said trim panel bracket received in said C-shaped portion and engaged by said finger of said clip of said support bracket.

11. A trim panel mounting assembly for a door on an automotive vehicle comprising:

a trim panel having a trim panel bracket mounted on one side of said trim panel and a door pull handle mounted to the trim panel through said trim panel bracket on the opposite side of said door trim panel and facing the interior of the vehicle such that said door pull handle is adapted to be grasped by an occupant in a vehicle to facilitate the opening and closing the door;

a structural inner door panel for supporting said trim panel and having a support bracket mounted to said inner door panel such that said support bracket is located opposite said trim panel;

said trim panel bracket including a clip and a leg with said leg disposed spaced from said clip on said trim panel bracket, said support bracket including a clip and a leg with said leg disposed spaced from said clip on said support bracket;

said clip and leg on said support bracket arranged asymmetrically with respect to said clip and leg on said trim panel bracket such that said leg of said trim panel bracket is received in said clip of said support bracket and said leg of said support bracket is received in said clip on said trim panel bracket to provide a direct load path for said door pull handle through said trim panel to said inner door panel of the vehicle.

12. A trim panel mounting assembly as set forth in claim 11 wherein said trim panel bracket includes a body portion extending between said clip and said leg on said trim panel bracket.

13. A trim panel mounting assembly as set forth in claim 12 wherein said support bracket includes a body portion extending between said clip and said leg on said support bracket and disposed opposite and spaced from said body portion on said trim panel bracket.

14. A trim panel mounting assembly as set forth in claim 13 wherein said clip of said trim panel bracket includes an integral C-shaped portion at one end of said trim panel bracket and a finger biased into adjacent disposition with said body portion on said trim panel bracket, said leg of said support bracket received in said C-shaped portion and engaged by said finger of said clip of said trim panel bracket.

15. A trim panel mounting assembly as set forth in claim 14 wherein said clip of said support bracket includes an integral C-shaped portion at one end of said support bracket and a finger biased into adjacent disposition with said body portion of said support bracket, said leg of said trim panel bracket received in said C-shaped portion and engaged by said finger of said clip of said support bracket.

* * * * *